Dec. 27, 1927.
H. W. GOFF
1,653,899
COUPLING
Filed Dec. 21, 1922
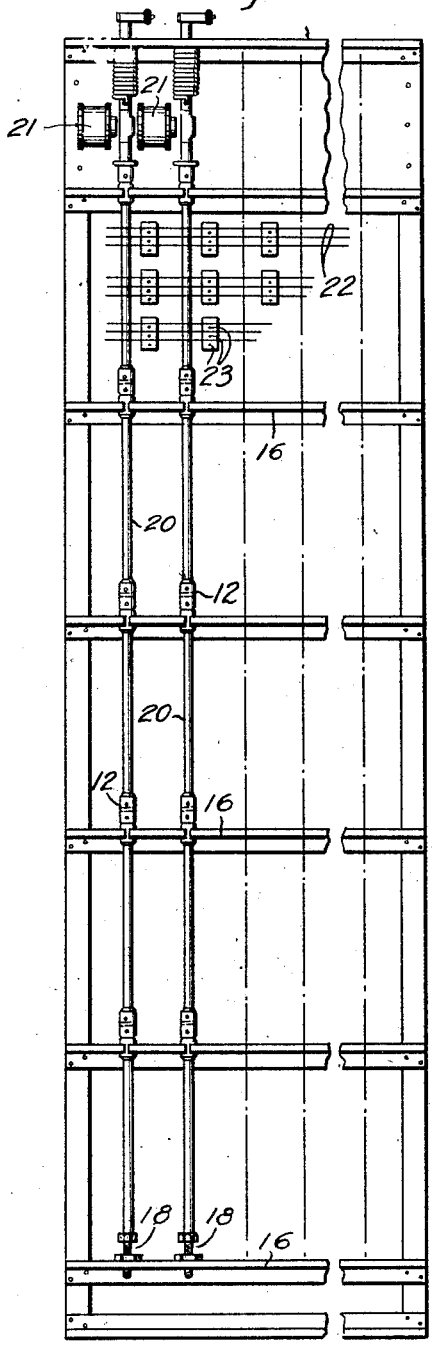
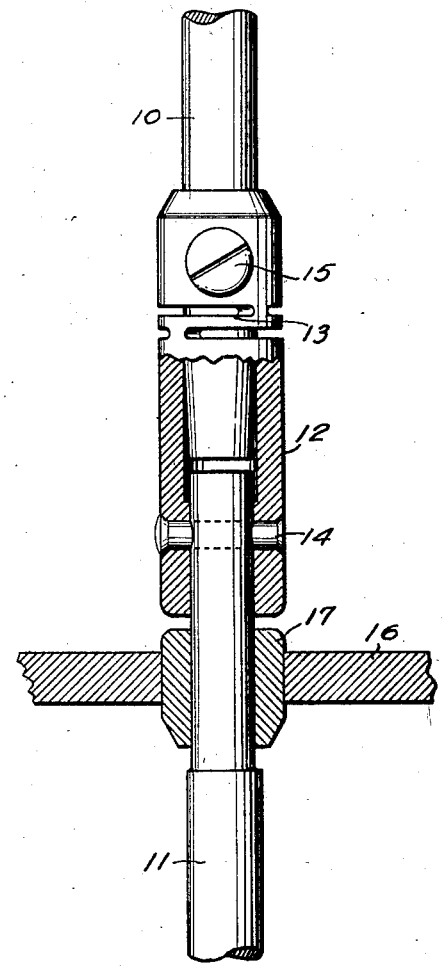
Inventor:
Harold W. Goff,
by W. E. Beatty, Atty.

Patented Dec. 27, 1927.

1,653,899

UNITED STATES PATENT OFFICE.

HAROLD W. GOFF, OF NEW YORK, N. Y., ASSIGNOR TO WESTERN ELECTRIC COMPANY, INCORPORATED, OF NEW YORK, N. Y., A CORPORATION OF NEW YORK.

COUPLING.

Application filed December 21, 1922. Serial No. 608,178.

This invention relates to couplings and more particularly to mechanical couplings of the type employed in joining vertical drive shafts.

It is the object of this invention to unite drive shafts by a simple, efficient and inexpensive coupling, whereby the coupled shafts may experience relative angular movements.

The foregoing object of this invention is obtained by the provision of a metallic sleeve having staggered saw-cuts or circular slots located near one end to effect a flexible coupling.

The invention will be readily understood from the following detailed description and by reference to the accompanying drawing in which Fig. 1 shows a view of the specific coupling to be described and claimed herein; Fig. 2 shows a sectional view of an automatic telephone switch of the coordinate type wherein couplings of this nature are extensively used.

In Fig. 1, there are shown the ends of two shafts 10 and 11 which are to be coupled by the sleeve 12. The sleeve 12 has two staggered saw-cuts or circular slots located near the upper end which cooperate with each other in forming a flexible diaphragm 13. The end of the shaft 10 is slightly tapered so as to permit a small clearance between the shaft 10 and the inner surface of the sleeve 12. This clearance, together with the flexible diaphragm 13, allows the shaft 10 to experience a limited angular movement relative to the shaft 11.

The sleeve 12 is made fast to the shaft 11 by means of the rivet or bolt 14 and by manipulating the screw 15, the position of the sleeve on the shaft 10 may be varied. The shaft 11 rotatably carries a bearing sleeve 17 supported in an opening in the frame member 16. The shaft 11 is supported by a step bearing 18.

Fig. 2 discloses a coordinate switch, the operation of which may be had by reference to Patent No. 1,523,407 granted to H. F. Dobbin on January 20, 1925, and has been shown here merely to point out a particular application of the coupling shown in Fig. 1. It may be said, however, that the operating members 20—20 are rotated through a small arc by the energization of magnets 21—21, the armatures of which are rigidly mounted on the uppermost section of the members 20—20. In operating, a member 20 cooperates with another coordinately disposed operating member (not shown) to effect a connection between coordinately disposed sets of active and passive contacts, such as 22 and 23.

What is claimed is:

1. The combination with a driving member having a tapered portion and a driven member of a coupling comprising a cylindrical sleeve having transverse cuts therein to form relatively thin integral remaining portions rendering said coupling flexible, the angular movement between said members being limited by contact between the coupling and said tapered portion, and adjustable means for securing said coupling to one of said members.

2. The combination with a driving member having a tapered portion and a driven member of a coupling comprising a cylindrical sleeve having staggered transverse saw cuts therein to form relatively thin remaining portions rendering said coupling flexible, the angular movement between said members being limited by contact between the coupling and said tapered portion, and adjustable means for securing said coupling to the driving member.

3. The combination with a driving member having a tapered portion and a driven member of a coupling sleeve comprising two portions integrally united by staggered flexible ribs, the angular movement between said members being limited by contact between the coupling and said tapered portion, and an adjustable screw for securing said coupling to the driving member.

In witness whereof, I hereunto subscribe my name this 15th day of December A. D., 1922.

HAROLD W. GOFF.